United States Patent [19]
Bybee

[11] 3,798,821
[45] Mar. 26, 1974

[54] LINKAGE TYPE HOOK SETTER APPARATUS

[76] Inventor: Samuel M. Bybee, Hewins, Kans. 67024

[22] Filed: Nov. 7, 1972

[21] Appl. No.: 304,327

[52] U.S. Cl. .................................................... 43/15
[51] Int. Cl. ............................................ A01k 97/00
[58] Field of Search ............................ 43/15, 16, 17

[56] References Cited
UNITED STATES PATENTS
1,488,838  4/1924  Savoie .................................... 43/15
3,228,135  1/1966  Kricksfeld et al. ...................... 43/17

Primary Examiner—Louis G. Mancene
Assistant Examiner—Daniel J. Leach

[57] ABSTRACT

A hook setter apparatus comprising a lateral support assembly connectable to a support surface and an actuator assembly and a vertical support assembly extending therefrom. The actuator assembly, in the form of an elongated member, is pivotally connected at one end to the lateral support assembly and has an L-shaped arm pivotally attached to the other end thereof. The horizontal portion of the arm has a connector line with a hook thereon secured thereto and the vertical portion has a cam thereon. The vertical support assembly, also an elongated member, is pivotally connected at one end to the lateral support assembly and extends at an angle relative to the actuator assembly to an outer end which is engageable with the cam on the actuator arm. A support line is secured to the vertical support assembly through a guide and control member mounted on the end of the vertical support assembly and a spring extends between the actuator and vertical support assemblies. Movement of the connector line downwardly releases the cam from the vertical support assembly and the spring biases the actuator assembly upwardly to set the hook in the fish's mouth.

7 Claims, 5 Drawing Figures

LINKAGE TYPE HOOK SETTER APPARATUS

Numerous types of fish hook setter structures are known to the prior art but are not operable in a manner similar to the applicant's invention and are complicated and expensive to manufacture.

In one preferred embodiment of this invention, a linkage type hook setter apparatus is provided having a lateral support assembly; an actuator assembly having one end pivotally connected to the lateral support assembly; a vertical support assembly operably engageable with the actuator assembly; and a fish hook assembly connected to a portion of the actuator assembly operable on downward movement to actuate the hook setter apparatus. The lateral support assembly includes a first support assembly and a spaced second support assembly, each having cooperating L-shaped angle members to provide support. The vertical support includes an elongated latch arm member to be connected at one end to the actuator assembly, a directional member connected to a central portion of the latch arm member, and a guide and control member mounted on the opposite end thereof. The outer end of the latch arm member is provided with a cut-out or indent portion adapted to engage the actuator assembly. The directional member includes a U-shaped arm member connected by a nut and bolt member to one of a plurality of spaced holes in the latch arm member and having a support line connected thereto trained through the guide and control member. The guide member is of somewhat a V-shaped in a vertical plane having an upper U-shaped portion to receive the support line therethrough and the other one to receive a portion of the actuator assembly to limit outward movement. A central portion of the latch arm member is connected by a nut and bolt member to the second support assembly. The actuator assembly includes an L-shaped actuator arm having an upper leg portion engageable with the latch arm member; a lower leg portion of the actuator arm is pivotally to a connector link member; and a biasing means mounted between the link member and latch arm member. The connector link member has a plurality of holes to receive the biasing means which is also connected to the latch arm member and having an innermost end connected by a nut and bolt member to the first support assembly. The L-shaped actuator arm is pivotally connected to the outer end of the connector link member. The upper leg section of the actuator arm has laterally extended cam sections to receive the latch section of the latch arm member. The outer end of the lower leg portion of the actuator arm is connected to the fish hook assembly. The biasing means can be of various types such as a pair of tension spring members to provide the setting and holding force to the entire setter apparatus. The fish hook assembly includes a spinner member pivotally connected to the outer end of the lower leg portion having a connector line with the lower end thereof secured to a fish hook.

One object of this invention is to provide a linkage type hook setter apparatus having an actuator assembly pivotally connected to a support assembly on the outer end whereupon movement of the fish hook assembly operates the actuator assembly to set the fish hook assembly and apply a spring tension to attach and then hold a fish member.

One other object of this invention is to provide a hook setter apparatus having a lateral support assembly readily connectable to a horizontal support member and can receive an elongated rod member therein for anchoring in a fishing bank or can be connected to a boat structure providing the necessary support for catching a fish member.

Still, one further object of this invention is to provide a hook setter apparatus having adjustable biasing means operable through an actuator assembly under various spring pressures to set a hook member in a fish member and maintain tension thereon.

Still, one further object of this invention is to provide a hook setter apparatus which is economical to manufacture; simple in construction; easy to place in the loaded condition; constructed with numerous adjustable features thereon depending on the various sizes and types of fish members desired to be caught therewith; and substantially maintenance free.

Various other objects, advantages, and features of this invention will become apparent to those skilled in the art from the following discussion, taken in conjunction with the accompanying drawings, in which.

Figures 1, 2:
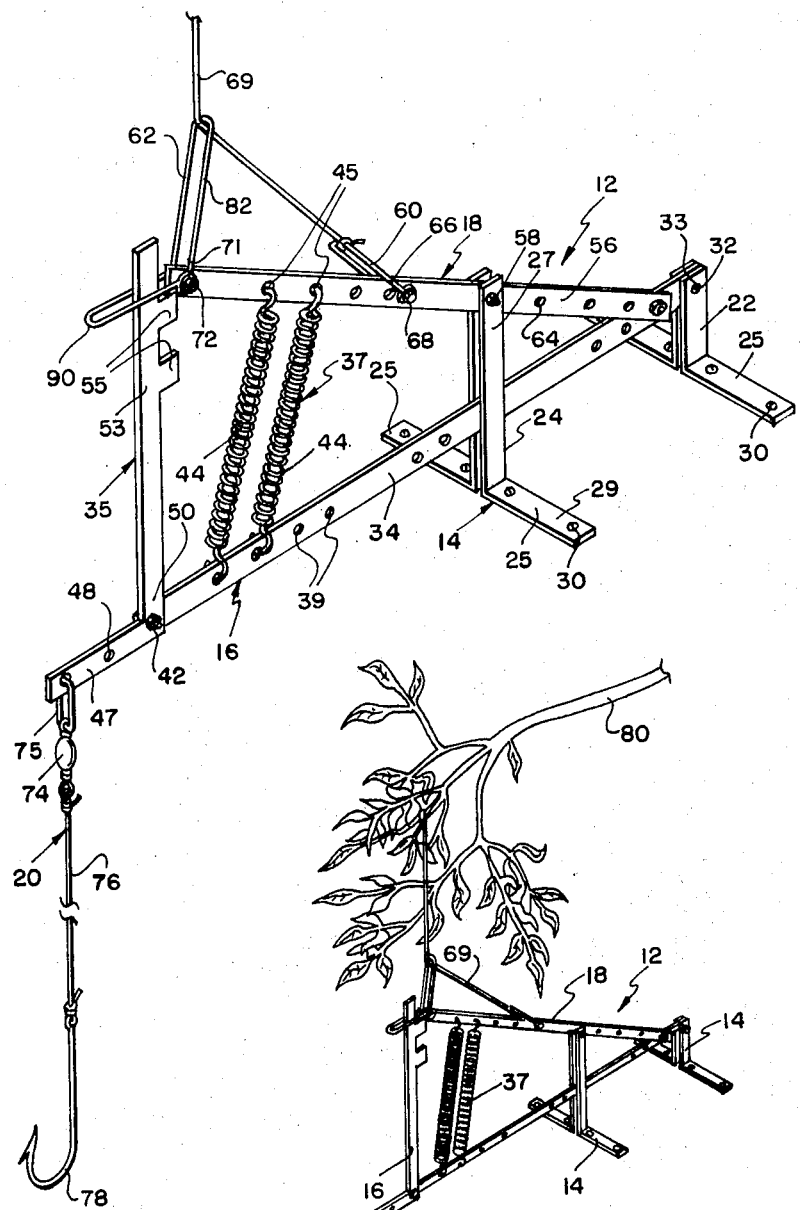
FIG. 1 is a perspective view of a linkage type hook setter apparatus of this invention.
FIG. 2 is a perspective view similar to FIG. 1 illustrating the hook setter apparatus connected to a tree structure having a fish hook assembly extended into the fishing waters.

The following is a discussion and description of preferred specific embodiments of the new linkage type hook setter apparatus of this invention, such being made with references to drawings whereupon the same reference numerals are used to indicate the same and-/or similar structures. It is to be understood that such discussion and description is not to unduly limit the scope of the invention.

Referring to the drawings in detail in particular to FIG. 1, the linkage type hook setter apparatus, indicated generally at 12, includes a lateral support assembly 14; an actuator assembly 16 pivotally connected to the lateral support assembly 14; a vertical support assembly 18 pivotally connected to the lateral support assembly 14 and the actuator assembly 16; and a fish hook assembly 20 connected to a portion of the actuator assembly 16.

The lateral support assembly 14 includes a first support assembly 22 and a somewhat similar but larger spaced, second support assembly 24. The first support assembly 22 and the second support assembly 24 each includes a pair of L-shaped angle iron members 25, each having a long leg section 27 and a short leg section 29. The horizontal leg sections are provided with spaced holes 30 for anchoring same to a boat structure, a support board, or other means as will be explained. The short leg portions 29 are provided at the upper end with holes 32 to receive a nut and bolt member 33 for pivotal connection as will be noted.

The actuator assembly 16 includes an elongated connector link member 34 having one end pivotally connected to the first support assembly 22 and the opposite end pivotally connected to an L-shaped actuator arm 35. The actuator assembly 16 further includes a biasing means 37 connected between and to the connector link member 34 and the vertical support assembly 18.

The connector link member 34 has a plurality of spaced holes 39 to receive the biasing means 37 for purposes of adjustment. The innermost hole 39 is to receive the nut and bolt member 33 for pivot connection to the first support assembly 22. The outermost hole 39 is provided with a nut and bolt member 42 to pivotally connect the actuator arm 35 therewith. The connector line member 34 is of a strap material trained through the second support assembly 24 to maintain proper alignment for vertical movement.

The biasing means 37 includes tension spring members 44 having one end mounted in respective holes 39 in the connector link member 34 and the opposite end connected to holes 45 in the vertical support assembly 18.

The actuator arm 35 is of a generally L-shape having a short leg section 47 provided with a pair of holes 48 and pivotally connected at a corner section 50 by the nut and bolt member 42 to the connector link member 34. A long leg section 53 is provided with a pair of spaced, laterally extended cam sections 55 to receive the vertical support assembly 18 thereagainst as will be explained.

The vertical support assembly 18 includes a first latch arm member 56 pivotally connected at the innermost end of the connector link member 34 and pivotally connected in the central portion by a nut and bolt member 58 to the upper end of the second support assembly 24. The vertical support assembly 18 further includes a directional member 60 connected at a midportion and a guide and control member 62 secured to the outer end. The latch arm member 56 is provided with a plurality of spaced holes 64 throughout its length for adjustment purposes. The directional member 60 includes a U-shaped support member 66 having its open end connected by a nut and bolt member 68 to the latch arm member 56. The support member 66 is adapted to receive a support line 69 connected thereto for training through the guide and control member 62.

The guide and control member 62 is of a V-shape in a vertical plane made of bent wire material forming integral U-shaped loops jointed at a central portion indicated at 71 and connected by a nut and bolt member 72 to the outer end of the latch arm member 56. The latch arm member 56 is provided with an outer latch section 73 of a V-shape to be received against the cam sections 55 of the actuator arm 35 in a manner to be explained.

As shown in FIG. 1, the fish hook assembly 20 includes a swivel type spinner member 74 having an upper ring section 75 to be placed in one of the holes 48 of the short leg section 47 of the actuator arm 35. The fish hook assembly 20 further includes a connector line 76 secured to the spinner member 74 and a fish hook member 78 secured to the connector line 76. It is obvious that weight members (not shown) could be added to the connector line 76 as desired.

In the use and operation of the linkage type hook setter apparatus 12 as shown in FIG. 2, the vertical support assembly 18 can be secured by the support line 69 to a tree structure 80. The support line 69 is secured to the guide member 60 and trained through an adjacent leg section 82 of the guide and control member 62. The actuator arm 35 is connected to the fish hook assembly 20 whereupon the hook member 78 can be baited as desired for fishing purposes and placed in fishing waters as indicated at 84.

Figure 5:
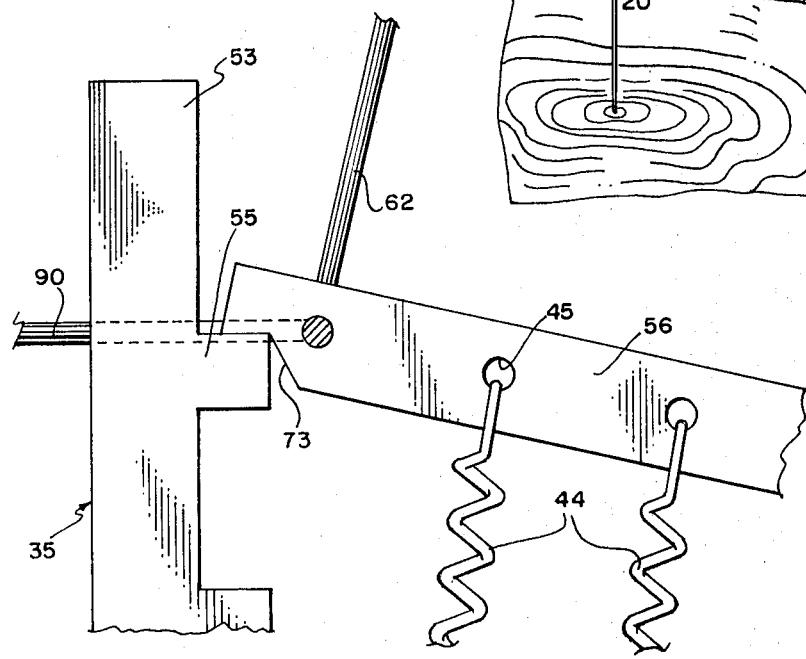
FIG. 5 is an enlarged fragmentary elevational view illustrating a latched connection of an actuator assembly of the hook setter apparatus of this invention.

First however, the actuator assembly 16 is placed in the latched condition which is caused by grasping the long leg section 53 of the actuator arm 35 in one hand and the latch arm member 56 of the vertical support assembly 18 in the other hand and moving the hands in opposite directions against the force of the spring members 44. On reaching the required separation, the actuator arm 35 can be moved upwards towards the latch arm member 56 to the condition shown in FIG. 5 with the latch section 73 and cam section 55 in contact. The spring members 44 can be moved from the position of FIG. 1 to vary the spring force thereon which regulates the force on the fish hook assembly 20 in order to release the actuator assembly 16. Also, it is noted that numerous cam sections 55 can be formed on the actuator arm 35 so that the latch section 73 can be placed against various ones of the cam sections 55 to vary the adjustment thereof.

Figure 3:
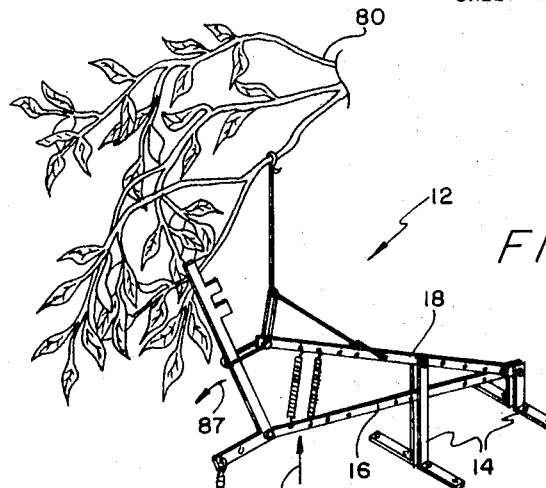
FIG. 3 is a view similar to FIG. 2 illustrating the hook setter apparatus being moved from the latched to the unlatched or actuated condition.

In the latched condition, it is obvious that on downward movement of the fish hook assembly 20, the actuator arm 35 is pivoted about its connection to the connector link member 34 so as to move the cam section 55 out of engagement with the latch section 73. This downward movement of the connector line 76, as indicated by the arrow 85 in FIG. 3, will cause the outward movement of the long leg section 53 as shown by the arrow 87 and upward movement of the entire actuator assembly 16 as shown by the arrow 89. This would thereupon cause a rapid upward movement of the actuator assembly 16 to set the hook member 78 and the spring members 44 would provide a biasing force to maintain tension on the connector line 76 but preventing the hook member 78 from being torn from the fish's mouth.

The guide and control member 62 has an outer loop section 90 placed about the actuator arm 35 which limits its rotional movement within the confines of the loop section 90.

Figure 4:
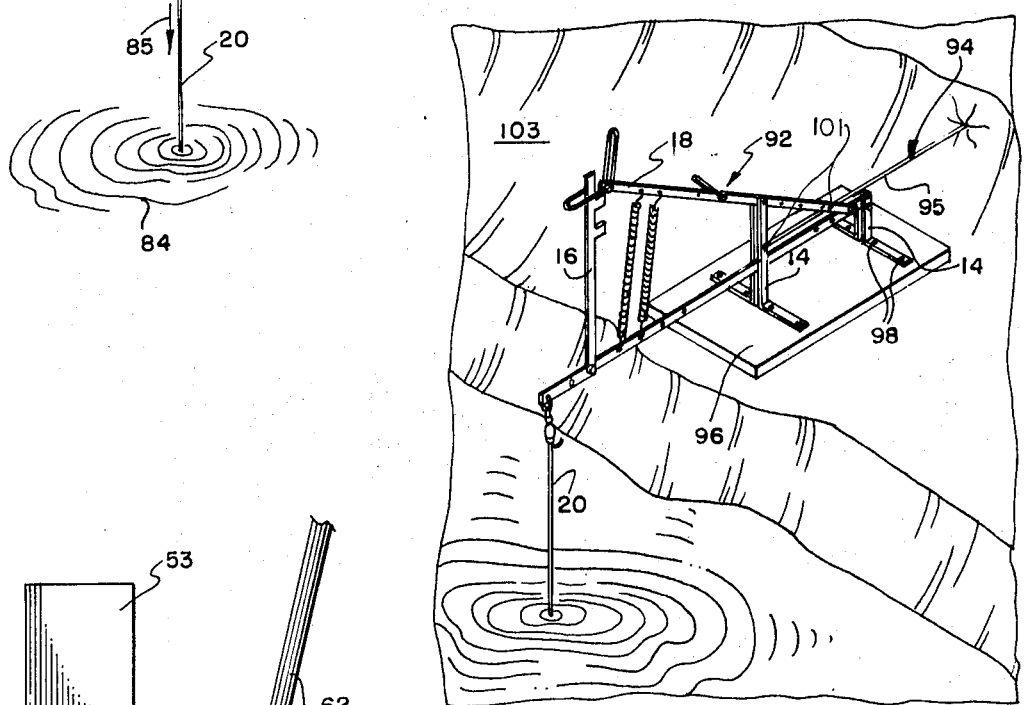
FIG. 4 is a perspective view of another embodiment of a hook setter apparatus of this invention as mounted on support member and having a spike or rod member for anchoring to an adjacent bank.

In another embodiment as shown in FIG. 4, a linkage type hook setter apparatus 92 is provided including the lateral support assembly 14; the vertical support assembly 18; the actuator assembly 16; the fish hook assembly 20; and further provided with an anchor and connector assembly 94. The anchor and connector assembly 94 is the modification of this embodiment over the hook setter apparatus 12 as previously described.

The anchor and connector assembly 94 includes a rod member 95 and a flat support member 96 which can be a board structure to receive the first support assembly 22 and the second support assembly 24 secured thereto by screw members 98. The elongated rod member 95 is connected by nut and bolt members 101 to the vertical support assembly 18 and the second support assembly 22 and can be anchored in the bank indicated at 103.

In the use and operation of the embodiment of FIG. 4, the hook setter apparatus 92 placed on a support surface to provide for vertical stability and the elongated rod member 95 can be anchored in the bank 103 to provide stability against movement in a vertical plane.

It is obvious that various other embodiments of the linkage type hook setter apparatus could be provided for anchorage as could be secured to a box structure as by nails or bolt members or could be attached to a fishing boat structure as by clamps.

It is seen that the linkage type hook setter apparatus of this invention can be economically constructed from flatstrap and angle iron material. The hook setter apparatus can be easily assembled in various conditions for adjustment purposes. Additionally, the linkage type hook setter apparatus of this invention is simple to assemble; economical to manufacture; adjustable in usage; reliable and safe in operation; and easy to place in the loaded condition.

The following invention is described in conjunction with preferred specific embodiments, it is to be understood this description is intended to illustrate and not to limit the scope of the invention, which is defined by the following claims.

I claim:

1. A linkage type hook setter apparatus operable to be connected to a support element for automatically setting and holding a fish hook member, comprising:
   a. a lateral support assembly adapted to be connected to a support surface,
   b. an actuator assembly having one end connected to said lateral support assembly,
   c. a vertical support assembly connected to said lateral support assembly and said actuator assembly,
   d. a fish hook assembly secured to said actuator assembly,
   e. said actuator assembly includes an actuator arm connected to said fish hook assembly and engagable with said vertical support assembly under a biasing force and moved to the unlatched condition under said biasing force on initial downward movement of said fish hook assembly,
   f. said vertical support assembly includes a latch arm member having a portion pivotally connected to said lateral support assembly and an outer end engagable with said actuator arm in the latched condition; and
   g. said vertical support assembly further including a directional member and a guide and control member connected to said latch arm member and a support line secured to said directional member and trained through said guide and control member connectable to a support element such as a tree limb.

2. A hook setter apparatus as described in claim 1, including:
   a. an elongated rod member secured to said lateral support assembly extended rearwardly therefrom to be placed within a support bank to prevent tipping of said setter apparatus, and
   b. said elongated rod member extended parallel to said lateral support assembly and the support surface into the support bank to prevent pivotal movement of said fish hook assembly.

3. A hook setter apparatus as described in claim 1, wherein:
   a. said actuator arm being of L-shape including a control portion pivotally connected to a link member and having cam sections engagable with said vertical support assembly, and
   b. said biasing force being at least one compression spring biasing said cam sections into engagement with said vertical support assembly.

4. A hook setter apparatus as described in claim 1, wherein:
   a. said guide and control member being of V-shape in a vertical plane having integral interconnected V-shape loop sections having a common central connectable pivotal point adapted to receive the support line therethrough, and
   b. said guide and control member is being operable on movement of said latch arm assembly to retain the same within given confines but allowing said support line to support the same in the unlatched condition for holding a fish member thereon.

5. A linkage type hook setter apparatus operable to be connected to a support element for automatically setting and holding a fish hook member, comprising:
   a. a lateral support assembly adapted to be connected to a support surface,
   b. an actuator assembly having one end connected to said lateral support assembly,
   c. a vertical support assembly connected to said lateral support assembly and said actuator assembly,
   d. a fish hook assembly secured to said actuator assembly,
   e. said actuator assembly includes an actuator arm connected to said fish hook assembly and engagable with said vertical support assembly under a biasing force and moved to the unlatched condition under said biasing force on initial downward movement of said fish hook assembly,
   f. said actuator arm being of L-shape including a control portion pivotally connected to a link member and having cam sections engagable with said vertical support assembly, and
   g. said biasing force being at least one compression spring biasing said cam sections into engagement with said vertical support assembly.

6. A hook setter apparatus as described in claim 5, wherein:
   a. said actuator arm and said link member having means therein for adjustably connecting said fish hook assembly and said biasing force to achieve variations in operation depending on type of fish members being sought.

7. A hook setter apparatus as described in claim 5, wherein:
   a. said vertical support assembly includes a latch arm member having a portion pivotally connected to said lateral support assembly and an outer end engagable with said actuator arm in the latched condition, and
   b. said vertical support assembly further including a directional member and a guide and control member connected to said latch arm member and a support line secured to said directional member and trained through said guide and control member connectable to a support element such as a tree limb.

* * * * *